United States Patent
Brown et al.

(10) Patent No.: US 10,894,215 B1
(45) Date of Patent: Jan. 19, 2021

(54) MATCHING PLAYERS FOR NETWORKED GAMING APPLICATIONS

(71) Applicant: Amazon Technologies, Inc., Reno, NV (US)

(72) Inventors: Bruce Erwin Brown, Burien, WA (US); Geoffrey Scott Pare, Seattle, WA (US); Brian James Schuster, Seattle, WA (US); Christopher David Byskal, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 769 days.

(21) Appl. No.: 15/635,050

(22) Filed: Jun. 27, 2017

(51) Int. Cl.
A63F 13/795 (2014.01)
A63F 13/67 (2014.01)
G06N 3/08 (2006.01)
G06N 3/04 (2006.01)

(52) U.S. Cl.
CPC ............ *A63F 13/795* (2014.09); *A63F 13/67* (2014.09); *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,776,091 | B1 * | 10/2017 | Lebrun | A63F 13/795 |
| 2013/0150160 | A1 * | 6/2013 | El Dokor | G06F 3/011 |
| | | | | 463/32 |
| 2014/0274362 | A1 * | 9/2014 | Dhawan | A63F 13/795 |
| | | | | 463/29 |
| 2014/0274402 | A1 * | 9/2014 | Michel | A63F 13/12 |
| | | | | 463/42 |
| 2016/0001181 | A1 * | 1/2016 | Marr | A63F 13/60 |
| | | | | 463/42 |
| 2017/0246539 | A1 * | 8/2017 | Schwartz | A63F 13/65 |
| 2018/0001205 | A1 * | 1/2018 | Osman | A63F 13/5375 |
| 2018/0169526 | A1 * | 6/2018 | Aghdaie | G06Q 30/02 |

(Continued)

OTHER PUBLICATIONS

Delalleau et al., Beyond Skill Rating: Advanced Matchmaking in Ghost Recon Online, Sep. 2012, IEEE Transactions on Computational Intelligence and AI in Games, vol. 4, No. 3, pp. 167-177 (Year: 2012).*

(Continued)

*Primary Examiner* — Alan Chen
(74) *Attorney, Agent, or Firm* — Hogan Lovells US LLP

(57) ABSTRACT

The present disclosure provides for matching users into user groups based on user attributes. A neural network is trained using training data including user data of users in an observed grouping and various outcomes or optimization parameters associated with the observed grouping. The trained neural network is used to process a set of queried players determine a match quality for the queried players with respect to certain outcomes or optimization parameters based at least in part on the user data associated with the users. The match quality is a measure of how optimized a group containing the queried users is with respect to the optimization parameters and can be compared to a threshold. The queried users may be matched into a group if the match quality meets or exceeds the threshold.

19 Claims, 8 Drawing Sheets

(56) References Cited

U.S. PATENT DOCUMENTS

2018/0369696 A1* 12/2018 Aghdaie ............... A63F 13/73
2019/0262718 A1*  8/2019 Xue ..................... A63F 13/48

OTHER PUBLICATIONS

Chen et al., EOMM: An Engagement Optimized Matchmaking Framework, Apr. 2017, WWW 2017, pp. 1143-1150 (Year: 2017).*
Laufer et al., Stacked Calibration of Off-Policy Policy Evaluation for Video Game Matchmaking, 2013, IEEE, total pp. 8 (Year: 2013).*
Prakannoppakun et al., Skill Rating Method in Multiplayer Online Battle Arena, Electronics, Computers and Artificial Intelligence Jun. 30-Jul. 2, 2016, total pp. 6 (Year: 2016).*

* cited by examiner

MATCHING PLAYERS FOR NETWORKED GAMING APPLICATIONS

BACKGROUND

Many software applications, such as games, include networked features that allow users to interact with each other in various ways. In the case of games, networked gameplay allows players to play multi-player games with other players via a network such as the internet. Many players may sign up to play a certain game, and need to be matched into groups with one or more other players to play the game. For example, a certain game may require four players, and twenty players may be signed up to play the game. Thus, the twenty players may be assigned to five different game sessions of the game, with four players assigned to each game session. The four players in the same game session play the game together. The players in a game session may compete with each other in a competition, cooperate with each other to accomplish a goal, or otherwise interact with each other. Thus, the matching or grouping of players into a game session may influence the game session outcome and gaming experience of the players in various ways, creating a challenge faced by many networked game providers. Similar challenges may be faced by providers of other types of software applications in which users are matched into groups.

BRIEF DESCRIPTION OF THE DRAWINGS

Various embodiments in accordance with the present disclosure will be described with reference to the drawings, in which.

DETAILED DESCRIPTION

Figure 1:
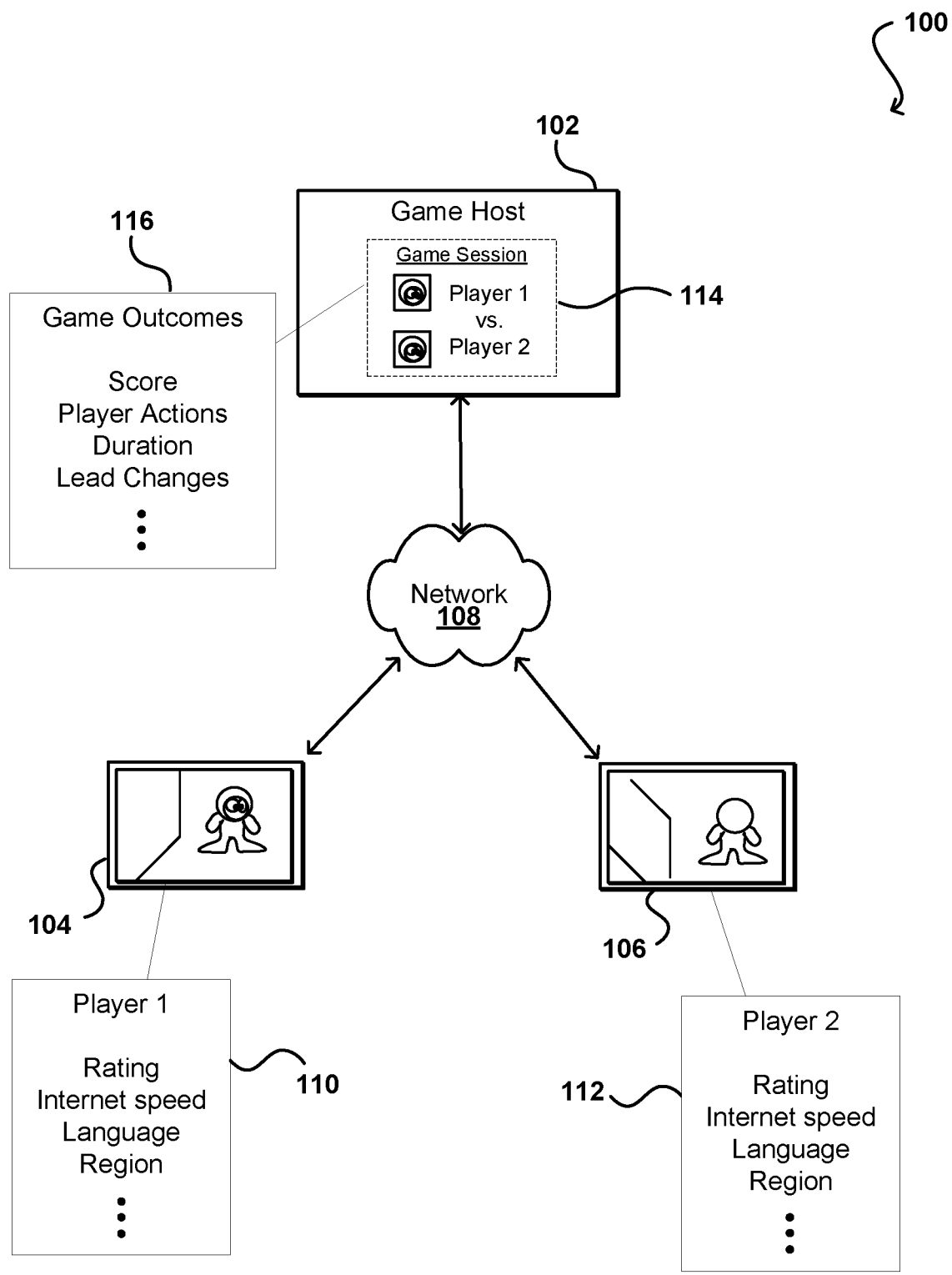
FIG. 1 illustrates an example scenario in which the user matching techniques of the present disclosure can be utilized, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in optimizing user matching for networked applications. In particular, various embodiments provide for strategically matching users into a group for a joint session of an application such as a gaming application based on user attributes. In this example, game participants or other such users of a gaming session can be matched by designing and training a neural network or other machine learning-based approach to estimate a quality of a grouping of users with respect to an optimization goal based on user data. Although various embodiments described herein reference a gaming environment that includes gaming applications, the techniques described herein can readily be applied to various other types of applications and/or environments for those applications.

In a gaming example, to initiate a multi-player game session, a set of players from a pool of players are matched together and assigned to the game session, in which the matched players can play the game together and interact with each other. A quality of the game session, such as how enjoyable the game session was for the players, may be influenced by how compatible or well matched the players are. Each player may have many player attributes that could be correlated with the quality of the game session in various ways. However, the relationship between player attributes and the quality of the game session is undefined. Furthermore, the quality of the game session may be represented by one or a combination of many outcome parameters associated with the game session, further complicating the correlation.

The present techniques allow for managing quality of game sessions by matching players based on player attributes. This is made possible at least in part by designing a neural network that can estimate relationships between player attributes and a quality of the game session based on data from observed game sessions, and thus estimate an expected quality of a game session for a given set of players based on player attributes. In various embodiments, the neural network may be trained using training data obtained from observed game sessions involving a set of players. The training data includes player attributes of the set of players and game outcome parameters that represent a quality of the observed game session. Thus the player attributes and game outcome parameters associated with the observed game session form an input-output pair, respectively. The training data may include a plurality of such input-output pairs from a plurality of observed game sessions. Based on this training data, the neural network is able to estimate an expected quality of a game session involving a given set of players based on the player attributes of the given set of players. In various embodiments, the expected quality of the game session may determine a match quality of the given set of player, or how well matched the given set of players are with respect to optimizing for the game session quality. In some embodiments, the match quality of the given set of players is determined based on how the expected quality compares to the quality of a plurality of observed game sessions.

After the neural network is trained, a queried set of players can be processed through the neural network to determine the match quality of the queried set of players. In various embodiments, upon determining a match quality of the queried set of players, the match quality can be compared to a threshold to determine whether the queried set of players are well matched enough to be assigned to a multi-player game session. If the match quality of the queried set of players does not meet the threshold, a different combination of players from the pool of players may be queried and processed through the neural network until a combination of players has a match quality that meets the threshold. The set of queried player can be selected according to various player querying schemes and the threshold for assigning a set of queried players to a multi-player game session may be determined based on various factors.

Being able to estimate the expected quality of a game session for a given set of players before assigning the players to a multi-player game session provides a means for increasing the quality of player matching and optimizing game sessions with respect to desired optimization goals, as the quality of the game session represents a measure of an optimization goal. As mentioned, one example of an optimization goal is player experience, or how enjoyable a game session is to the players. This measure may be associated with certain outcomes of the game session, such as a point spread or number of actions taken by the players. For example, player matching may be optimized, using the techniques described above, to minimize the point spread between players or teams in a game session. In another example, the measure of player experience may be a user reported rating, in which the players in an observed game session of the training data were asked to rate the game session. In this example, user rating is the optimization goal, and the player attributes and the associated user ratings are the inputs and outputs, respectively, of an input-output pair of the training data. As such, the neural network is trained to optimize for user rating based on player attributes, and the match quality of a queried set of users is with respect to the expected user ratings of the queried set of players. In other use cases, the optimization goal may be various types of optimization parameters in addition to those related to player experience, such as an engagement measure, a monetization measure, among others.

FIG. 1 illustrates an example system implementation 100 utilizing player matching techniques in accordance with various embodiments. In this example, for a gaming application, a game host 102 can execute or at least manage game state for instances of a gaming application that can be played by players 104, 106. Players 104, 106 may access the gaming application through various player devices. A player device may include devices through which a player can play or otherwise interact with the game, and include at least one form of input such as a keyboard or controller, and at least one form of output such as a display. Player devices can include specific gaming devices, such as gaming consoles or handheld consoles, or other computing devices such as smart phones, tablet computers, wearable computers (e.g., smart glasses or watches), desktop or notebook computers, and the like. The Player devices can communicate with the game host 102 over at least one network 108, such as the Internet, a cellular network, a local area network (LAN), an Ethernet, Wi-Fi, a dedicated gaming network, or a peer-to-peer network, among other such options, such that the game host 102 can communicate with and control various aspects of gameplay on the player devices and the player devices can interact with the game host 102 and in some embodiments, with each other.

A group of players such as player 1 104 and player 2 106 may be matched together in a game session 114 such that the matched players 104, 106 can play the game together and interact with each other. A game session may be a duration of gameplay defined by the completion of one or more tasks or goals, or defined by a certain time duration. In various embodiments, a game session may involve a specific number of players, a minimum number of players, or a maximum number of players. Examples of a game session may include a chess game, a race, a battle, a puzzle, a journey or task to complete, among others. In some embodiments, a game session may include a series of game stages or other game sessions. The game session 114 may be associated with one or more outcome parameters 116 that represent various measures or outcomes of the game session. For example, outcome parameters 116 of a game session may include game results such as a number of points scored by each player, a score difference between the players, time duration, and the like. Outcome parameters 116 may also include gameplay statistics of the game session such as the number of actions performed by each player, lead changes between players, amount of communication between players, and the like. Some outcome parameters are considered to be correlated with how enjoyable the game session was for the players. For example, a low score difference between the players and a high number of actions performed by the players may indicate that the game session was relatively more enjoyable than a game session in which there was a high score difference between the players and a short time duration. Thus, it may be advantageous to optimize for certain outcome parameters, in order to provide more enjoyable gaming experiences for players. Such parameters may be called optimization parameters, or parameters whose values for which to optimize (e.g., maximize or minimize). Optimization parameters may be defined by discrete or continuous values. Player enjoyment is one example of an optimization parameter. Optimization parameters may include one or more game outcome parameters, player engagement and retention, player acquisition, player monetization, among many others. Thus, the present techniques provide for player matching that can optimize for a wide variety of goals.

In various embodiments, the present disclosure provides techniques for establishing game sessions that optimize for optimization parameters by strategically matching or grouping players for the game sessions based on player data. In some embodiments, players 104, 106 are associated with respective player data 110, 112 that may include one or more player attributes. The player attributes may be various types of data or attributes associated with the specific player or player account. For example, player attributes may include game-specific attributes such as player rating or experience, character type, account type, and the like. Player attributes may also include player device or player system specifications such as processor speed, network communication speed, device type, software specification, and the like. Player attributes may also include player-centric attributes such as geographic location, language, age, and the like. There may be a large number of player attributes and each player attribute may have many possible values, including both discrete and continuous values, resulting in a vast number of combinations. Furthermore, the number of game outcome parameters may be large as well, and potential optimization parameters may include various combinations of game outcome parameters or other optimization parameters. As such, any or any combination of player attributes may influence any or any combination of game outcomes and other optimization parameters. Thus, the relationship between specific player attributes and specific game outcomes, including optimization parameters, of a networked game session is largely unknown, and due to the large amount of data, mathematically intractable, meaning that conventional computing methods may not be able to achieve a potential level of player matching optimization. The present techniques overcome this technological hurdle at least in part by training a neural network using data from observed game sessions, including the respective player attributes and game outcomes associated with the observed game sessions, and using the neural network to determine a match quality for potential player groupings with respect to certain optimization parameters based at least in part on the player attributes associated with the potential players. Observed game sessions refers to real game sessions that have been previously played and for which observed values of player attribute and observed values of game outcomes and optimization parameters associated with the game session are available. In some embodiments, the match quality is a measure of how optimal the potential group of players is with respect to the optimization parameters. The systems and methods of the present disclosures utilize such techniques along with other techniques described in further detail within various networked player matching methods that create optimized game sessions with minimal computing resources.

Figure 2:
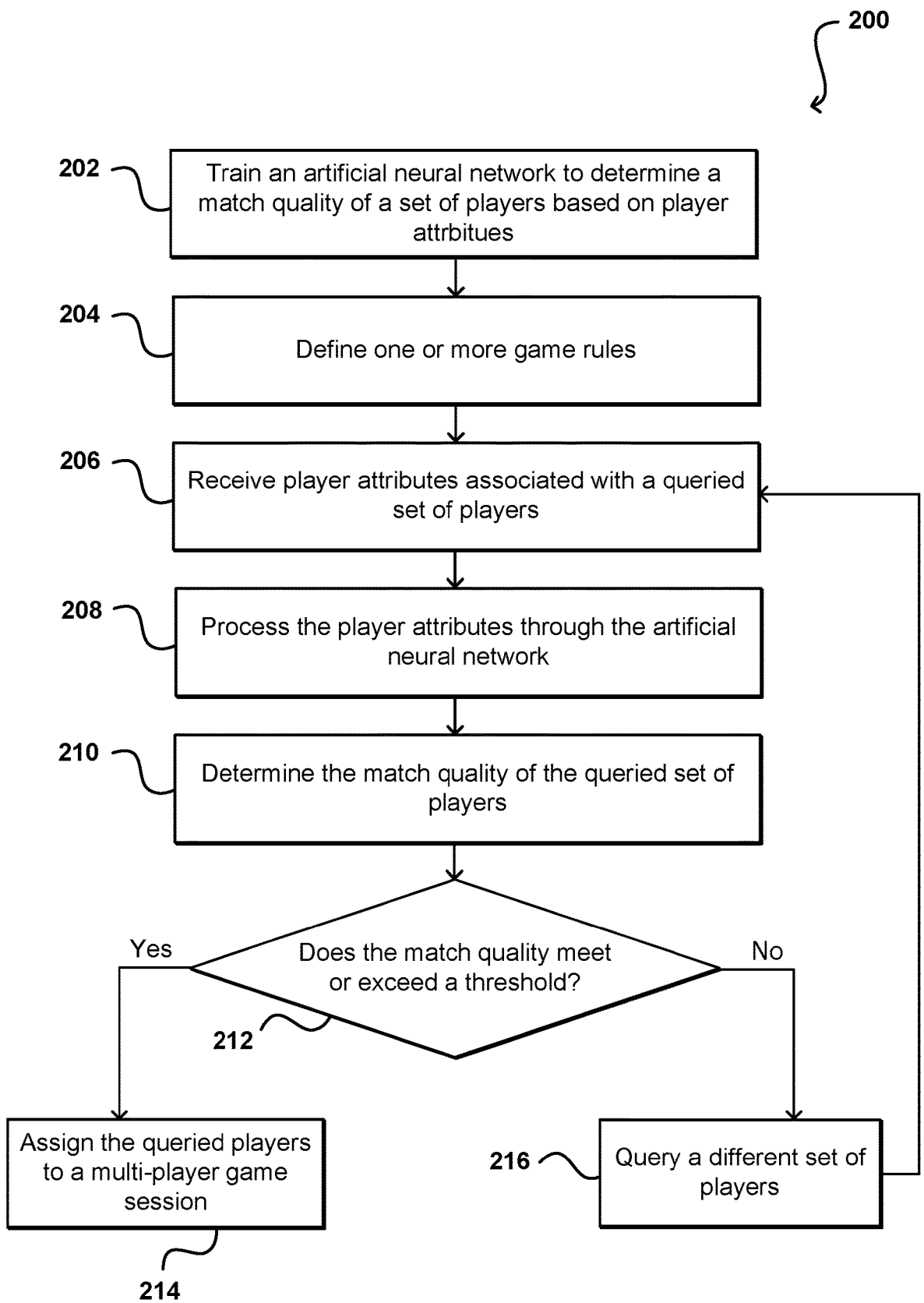
FIG. 2 is a flowchart illustrating a user matching process, in accordance with various embodiments.

FIG. 2 is a flowchart illustrating a player matching process 200, such as for a gaming application, in accordance with various embodiments of the present disclosure. In some embodiments, the process 200 may be executed by the game host 102 of FIG. 1. It should be understood that, for any process discussed herein, there can be additional, fewer, or alternative steps performed in similar or alternative orders, or in parallel, within the scope of the various embodiments unless otherwise stated. In this example, a neural network is trained to determine a match quality of a set of players for a game with respect to an optimization parameter 202. The neural network may be trained using training data obtained from an observed game session involving an observed set of players. The training data may include player attributes associated with the observed set of players, and game outcome parameters associated with the observed game session, including the optimization parameter.

In some embodiments, the game may include one or more game rules. Thus, the game rules are received and defined 204. Game rules may refer to known constraints of a particular type of game that may be consistent across game sessions of that type of game. Game rules may be different for different types of games, and provide certain rules for the player matching, such as minimum and maximum number of players per game session, different game roles of a game session, and the like. In some embodiments, a plurality of players may sign up to play the game and may be collected in player pool, such as a waiting list or virtual waiting room. A set of players from the player pool may be selected as a queried set of players to determine if such a set of players is well matched enough to be assigned to a multi-player game sessions. In doing so, player attributes of the queried set of players are received 206 and processed through the neural network 208. The player attributes of the queried set of players may be received from the player device, the content provider, or from a data store in the resource provider. The neural network determines a match quality of the set of queried players 210. Specifically, the match quality of the set of queried players is based at least in part on the player attributes of the queried set of players.

The match quality is a measure of how well matched the set of queried players are with respect to the optimization parameter. Specifically, in some embodiments, the neural network may determine an expected value of the optimization parameter based on the player attributes of the queried set of player, and the match quality may be determined or derived from the expected value of the optimization parameter. In certain such embodiments, the match quality may be derived from the expected value of the optimization parameter relative to a distribution of observed values of the optimization parameter from the observed game sessions of the training data or other expected values of the optimization parameter estimated by the neural network for other queried sets of players. In such cases, the match quality of the queried set of players is a relative to the performance of sets of players.

The match quality may be compared with a threshold to determine if the match quality meets or exceeds the threshold 212. The threshold represents a minimum match quality that is designated as acceptable for matching the queried set of players to a multi-player game session. If the match quality meets or exceeds the threshold, the set of the queried players are assigned to a multi-player game session and can play the game together 214. In some embodiments, the assignment of the queried players into the multi-player game session may be based at least in part on the game rules. For example, the set of queried players may be assigned as opponents in a one-on-one type game. In another example, the set of queried players may be assigned into two teams within the multi-player game session, in which a first subset of the queried set of players is assigned to a first team and a second subset of the queried set of players is assigned to a second team, based on player attributes. The set of queried players may be assigned to general roles in the game session in which the roles are the same, or to specific roles in the game session in which the roles are different and provide different gameplay within the game session.

In various embodiments, if the match quality does not meet or exceed the threshold, the set of queried players may not be assigned to a multi-player game session. Rather, a new set of potential players may be queried 216. In some embodiment, the new set of players may include a subset of the previously queried players and at least one different player, or all new players. Player attributes of the new set of queried players are then received 206 and processed through the neural network 208 to determine a new match quality for the new set of queried players 210. Such an iterative process may be performed until the match quality of a queried set of players meets or exceeds the threshold and are assigned to a multi-player game session 214. In some embodiments, if a queried set of players is not assigned to a multi-player game session 214 after a certain number of iterations or after a certain amount of time, the threshold may be lowered from a first tier threshold to a second tier threshold, thereby increasing the likelihood of a queried set of players meeting the threshold.

In some embodiments, a player matching process of the present disclosure may be practiced without training the neural network. In such embodiments, the neural network may already be trained or otherwise programmed. For example, a player matching process of the present disclosure may include providing a neural network trained to determine a match quality of player grouping with respect to an optimization parameter for a given set of players, in which the match quality is based at least in part on player attributes associated with the given set of players. In some embodiments, an experiment group of players may be assigned to a game session without being processed through the neural network or whose match quality does not meet the threshold. The experimental group of players can play the game session and the outcome parameters including potential optimization parameter values of the game session are detected. The player attributes of the experimental group of players and the outcome parameters are used as training data to further train the neural network. This provides a more diverse collective training data for the neural network, which may result in a more robust neural network.

Figure 3:
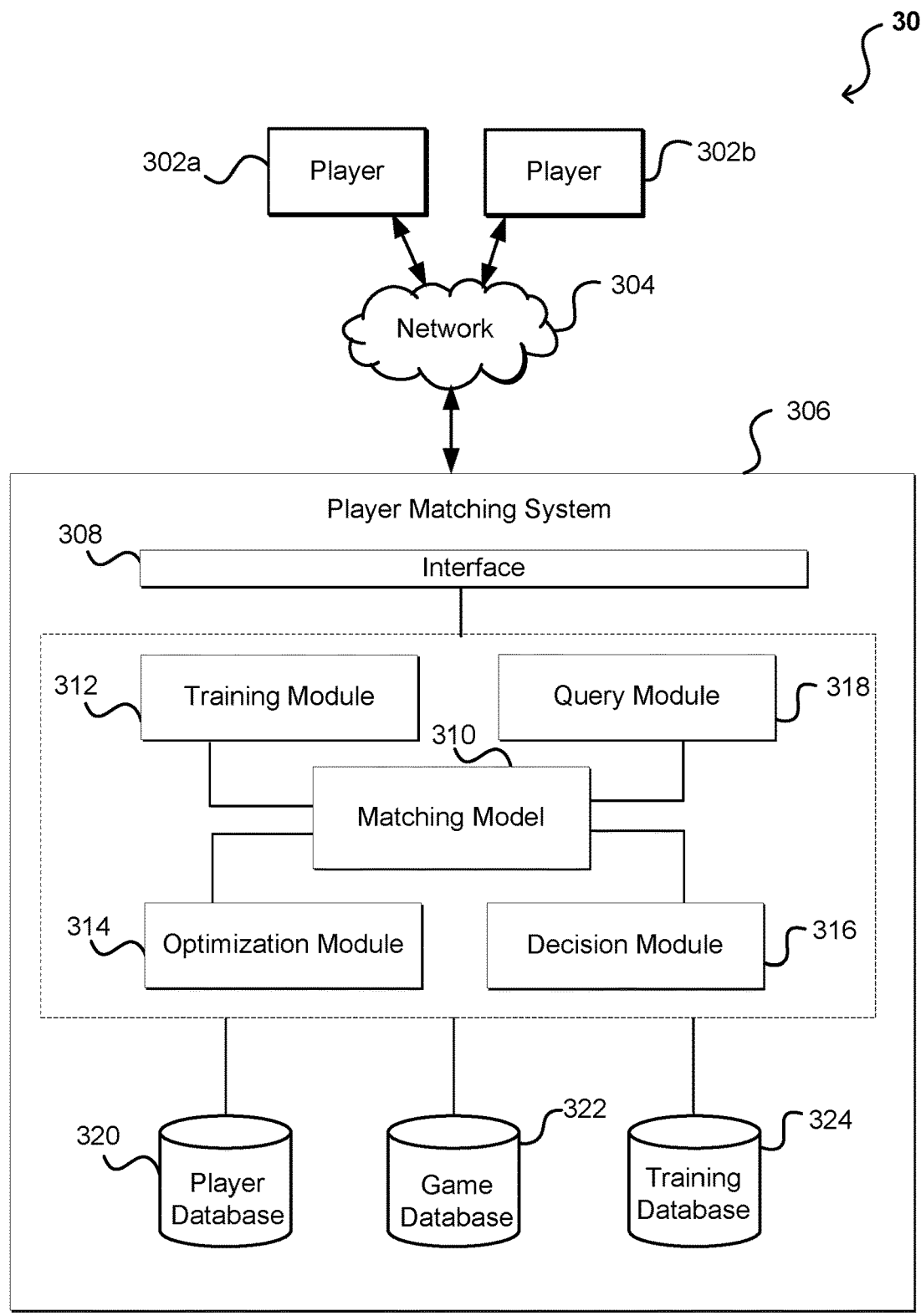
FIG. 3 illustrates an example system implementation with user matching, in accordance with various embodiments.

FIG. 3 illustrates a diagram of an example system implementation 300 for matching players into a multi-player game session based on player attributes, in accordance with various embodiments. For example, system implementation 300 may provide for carrying out the player matching process 200 of FIG. 2. In various embodiments, players 302a, 302b who want to play a multi-player game may access the player matching system 306 to be matched with other players also wanting to play the multi-player and start a multi-player game session. In an example, players 302 are able to send and receive information, such as requests, calls, and data, across one or more networks 304 to the player matching system 306. This may include a request to start or join a game session. In some embodiments, players 302a, 302b may represent player-side devices that include any type of computing devices having network connectivity, including personal computers, game consoles, tablet computers, smart phones, notebook computers, and the like. Players 302a, 302b may be connected to the player matching system 306 via the network 304, and the player matching system 306 may provide individualized service to each player 302a, 302b. The network 304 can include any appropriate network, such as the Internet, a local area network (LAN), a cellular network, an Ethernet, Wi-Fi, Bluetooth, radiofrequency, or other such wired and/or wireless network. In some embodiments, players 302a, 302b may access the player matching system 206 through different types of networks. The player matching system 306 may provide the multi-player game session to the players 302a, 302b. In some embodiments, the player matching system 306 may provide multiple game sessions to multiple sets of players, respectively. The player matching system 306 may be accessed by the players 302a, 302b through the gaming interface of the game. The player matching system 306 can include any appropriate resources for performing the various functions described herein, and may include various servers, data stores, and other such components known or used for providing content from across a network (or from the "cloud").

In various embodiments, the player matching system 306 may include an interface 308, a match model 310 a training module 312, an optimization module 314, a decision module 316, and a query module 318. The system 306 may also include a player database 320, a game database 322, and a training database 324. Such modules and databases may be implemented jointly, separately, or in any combination on one or more devices, including physical devices, virtual devices, or both. Information may be passed between any of the modules and databases through the physical and/or virtual devices on which the modules and databases are implemented.

The interface layer 308 of the player matching system 306 can facilitate communication between the players 302a, 302b and the player matching system 306. Requests received by the player matching system 306 can be received by the interface layer 308. Example requests may include a request to be matched with other players in a game session. Players 302a, 302b may also provider other information to the player matching system 306 via the interface such as certain player attributes and preferences, at least some of which may be used for player matching. The interface layer 308 may also provide outputs from the player matching system 306 to the players 302a, 302b, such as game session assignments and game role assignments, updates and notifications, among others. The interface may also facilitate communication between a resource provider and a content provider. In some embodiments, the player matching system 306 may be implemented within or provided by a resource provider environment. The content provider may by the developer or manager of the game and communicate with the player matching system 306 via the interface 308 to define one or more optimization parameters, game rules, provide training data, among others. The player matching system 306 may communicate with the content provider via the interface 308 to provide player matching statistics and other feedback and information. In some embodiments, the interface 308 may provide different client-facing interfaces for the players and the content provider. The interface layer 308 may include components such as interfaces (e.g., APIs), load balancers, request and/or data routers, and the like.

The match model 310 may receive a set of queried players and player attributes associated with the queried player to determine a match quality of the set of queried players with respect to one or more optimization parameters, in which the match quality is based at least in part on the player attributes. The match model 310 may various types of models including machine learning models such as include one or more machine learning models such as neural network trained to determine a match quality of the set of queried players. Other types of machine learning models may be used, such as decision tree models, associated rule models, neural networks including deep neural networks, inductive learning models, support vector machines, clustering models, regression models, Bayesian networks, genetic models, various other supervise or unsupervised machine learning techniques, among others. The match model 310 may include various other types of models, including various deterministic, nondeterministic, and probabilistic models.

In some embodiments, the match model 310 includes one or more neural networks trained to determine a match quality of the set of queried players with respect to one or more optimization parameters. The neural network may be a regression model or a classification model. In the case of a regression model, the output of the neural network is a value on a continuous range of values. For example, the queried set of players may be given a score on a continuous scale. In the case of a classification model, the output of the neural network is a classification into one or more discrete classes. For example, the set of queried players may be classified as "bad", "good", or "great" with respect to the optimization parameter. In some embodiments, the match model 310 may include a plurality of models, such as different models for different game types, and trained respectively. For example, a good player match for a one-on-one competition game may be different than a good player match for role playing game with different role types. In some embodiments, the match model 310 includes a single model trained to accommodate for various game types. In this embodiment, game type may be an input parameter of the training data.

The match quality of a queried set of players may be expressed in various forms, such as the example outputs types described above. In various embodiments, a neural network determines an expected value of the optimization parameter associated with queried set of players. The match quality is determined or derived from the expected value of the optimization parameters. In some embodiments, the expected value of the optimization parameter is compared to other observed values of the optimization parameter, and the match quality represents how the expected value compares with the observed values. Specifically, the observed values of the optimization parameter may form a scale or distribution, and the match quality represents where the expected value is on the scale or distribution.

In an example embodiment, the match quality may be or include a match score of the set of queried players on a match score scale, in which the match score scale is based at least in part on, or determined relative to, a distribution of observed values of one or more optimization parameters. The observed values of the optimization parameters may be obtained from training data or other past game sessions. For example, the smallest observed value of the optimization parameter and the highest observed value of the optimization parameter may represent the lower and upper ends of the match score scale. Data clustering at certain regions of the scale may also influence the distribution. In some cases, some observed values may be considered outliers and handled accordingly. Additionally, as more game sessions are player and observed, the distribution of observed values of one or more optimization parameters may change over time, thereby affecting the match score scale and thus the match score of a set of queried players.

Player attributes associated with queried players may be stored in the player database 320, such as in a player account. Player attributes may be various types of data or attributes associated with the specific player or player account. For example, player attributes may include game-specific attributes such as player rating or experience, character type, account type, and the like. Player attributes may also include player device or player system specifications such as processor speed, network communication speed, device type, software specification, and the like. Player attributes may also include player-centric attributes such as geographic location, language, age, and the like.

Training module 312 may train the match model 310 using training data. The training data may include game data from a plurality of observed game sessions in which each game session involves a set of players. For each observed game session, the game data may include a set of player attributes associated with the set of players and a set of game outcome parameters associated with the game session, including an optimization parameter. In some embodiments, the set of game outcome parameters may include a plurality of parameter that can be defined as the optimization parameter. For example, the neural network may be trained to correlate player attribute with any of or any combination of optimization parameters such that a content provider may designate which one or more optimization parameters for which to optimize, and the neural network can analyze a set of queried players with respect to the designated optimization parameters. In some embodiments, as the player matching system 306 is used to analyze queried players and assign the players to game sessions, the outcomes of such game sessions may be associated with the player attributes of the queried players and further used as training data to continuously train and update the neural network. In some embodiments, an experiment group of players may be assigned to a game session without being processed through the neural network or whose match quality does not meet the threshold. The experimental group of players may play the game session and the outcome parameters including potential optimization parameter values of the game session are detected. The player attributes of the experimental group of players and the outcome parameters are used as training data to further train the neural network. This provides a more diverse collective training data for the neural network, which may result in a more robust neural network.

In some embodiments, the observed player attributes of a game session may be considered a system input and the observed game outcomes or optimization parameters of the game session may be considered a system output. The neural network is trained using a large number of such input-output pairs to identify a correlation or regression function between player attributes and game outcomes or optimization parameters. The neural network than uses such a correlation or regression function to queried player attributes to predict the game outcomes or optimization parameters. For example, deep learning algorithms can transform these inputs through multiple layers of transformation to describe causal connections between input and output. In some embodiments, the prediction of the neural network are processed and normalized with respect to certain selected optimization parameters as a match quality. Additional details regarding training the neural network are provided further below and with respect to FIG. 4, so as not to obscure from the present discussion of the player matching system 306.

Training data, including observed player attribute values and associated optimization parameter values may include a wide range of data and can be obtained through various sources, including from observed game sessions, from the players, from the content providers, among others. For example, player attributes may include game-specific attributes such as player rating or experience, character type, account type, and the like. Player attributes may also include player device or player system specifications such as processor speed, network communication speed, device type, software specification, and the like. Player attributes may also include player-centric attributes such as geographic location, language, age, and the like. Some player attributes may be provided by the player, such as any type of player preferences or player information. Some player attributes are detected by the resource provider, such as data about the device or connection through which the player accesses the game. Some player attributes are generated during game play and assigned to the player. Such player attributes may be saved to the player account and can be used as the observed player attributes for any observed game session in which the player played.

Optimization parameters may include one or more outcome parameters that represent various measures or outcomes of the game session. For example, outcome parameters of a game session may include game results such as a number of points scored by each player, a score difference between the players, time duration, number of actions performed by each player, lead changes between players, amount of communication between players, and the like. Optimization parameters may also include holistic parameters such as a player enjoyment level, a monetization measure, an engagement measure, a performance measure, a retention measure, among others. In one embodiment, the optimization parameter may be a player reported rating, such as the player enjoyment level. For example, after a game session, players may be asked to rate how enjoyable the game session was, and the rating value recorded as an observed optimization parameter value. Some optimization parameters such as retention and monetization may be statistics provided by the content provider and associated with the observed game sessions, or derived from analytics performed by the resource provider. Some training data may be data collected by the content provider or the resource provider prior to or during utilization of the player matching system 306 and stored in the training database 324.

Optimization module 314 defines, at least in part, optimization parameters for which to analyze the queried set of players against. The optimization parameters may be any of the aforementioned non-limiting examples. In some embodiments, for any game or game type, a set of queried players may be analyzed with respect to a variety of different optimization parameters. The outcome of the analysis, or the match quality, for the same set of queried players may be different depending what parameter is designated as the optimization parameter. Furthermore, the match quality and threshold may be different depending on the designated optimization parameter. For example, the same set of queried players may meet the enjoyment threshold when analyzed with respect to player enjoyment by may not meet the monetization threshold when analyzed with respect to monetization. In some embodiments, the optimization parameter may be selected by a content provider or the resource provider.

In some embodiments, player matching may be analyzed for individual player optimization, in which the optimization parameters may include optimization parameters of individual players rather than of the game session. For example, it may be known or estimated based on gameplay patterns and statistics, that player 1 prefers game sessions in which player 1 has a significant advantage over the opponent. Thus, player matching for player 1 may be optimized to assign player 1 into game sessions in which player 1 is likely to have an advantage over the opponent. In another example, it may be known or estimated that player 2 prefers game sessions that are provide for even player field, in which no player has a significant advantage. Thus, player matching for player 2 may be optimized to assign player 2 into these types of game sessions. In such embodiments, the player matching system 306 may optimize for game session in which a set of players in a multi-player game session are each likely to experience their preferred gaming experience, even if the preferred experiences are different.

Decision module 316 receives data from at least the match model 310 to assign a set of queried players into a multi-player game session. In some embodiments, the decision module 316 may receive a match quality from the match model and compare the match quality with a threshold to determine if the match quality meets or exceeds the threshold. The threshold represents the minimum acceptable match quality value deemed acceptable for a set of players to be assigned to a multi-player game session. If the match quality meets or exceeds the threshold, the set of the queried players are assigned to a multi-player game session and can play the game together. In some embodiments, the assignment of the queried players into the multi-player game session may also be based at least in part on one or more game rules. For example, the set of queried players may be assigned to general roles in the game session in which the roles are the same, or to specific roles in the game session in which the roles are different and provide different gameplay within the game session. If the match quality does not meet or exceed the threshold, the set of queried players may not be assigned to a multi-player game session and a new set of potential players may be queried and process through the match model. Such an iterative process may be performed until the match quality of a set of queried players meets or exceeds the threshold and are assigned to a multi-player game session. In some embodiments, if a set of queried players is not assigned to a multi-player game session after a certain number of iterations or after a certain amount of time, the threshold may be lowered from a first tier threshold to a second tier threshold, thereby increasing the likelihood of a set of queried players meeting the threshold.

In some embodiments, the decision module 316 may receive a plurality of match qualities, each associated with a different optimization parameter or combination of optimization parameters. The different match qualities represents how optimized the set of queried players are with respect to different optimization parameters. The decision module 316 may receive, from the optimization module 314, a designated optimization module 314. The decision module 316 may then compare the match quality associated with the designated optimization module 314 with the threshold associated with the designated optimization module 314 to determine whether to assign the set of queried players to a multi-player game session.

Player query module 318 may select the player that make up a set of queried players from a pool of players based on a query selection protocol. The pool of user may be a virtual waiting room or list of logged on players waiting to be assigned to a game session. The set of queried players may be selected through various query schemes. In one example, two players may be queried together as a set of queried players for a one-on-one type game. The player query module 318 may select the first player in a list of potential player and select the next player down the list as the set of queried players until an assignment is made to a game session. Specifically, the first player and the second player on the list do not meet the threshold to be assigned to a game session, then the first player and the third player are queried together, then the first player and the fourth player, and so on until the first player and another player meet the threshold and are assigned to a game session. The first player and the matched player are then removed from the list and the selection process begins again. Such a process may continue as long as there are potential players on the list, including players being continuously added to the list. In some embodiments, if no set of players has met the threshold after a period of time, the threshold may be lowered. In another example, four players may be queried together as a set of queried players for a cooperative type game. The player module may randomly select four players from a pool of potential players to query together as the set of queried players. If the selected players meet the threshold and are assigned to a game session, the players are removed from the process may be iterated as long as there are at least four players in the list. If the selected players do not meet the threshold, then the selected players remain in the list and a new set of four players are selected. The new set of four players may include at least one different player. In some embodiments, if no set of players has met the threshold after a period of time, the threshold may be lowered. In some embodiments, some potential players may be prioritized to be queried, depending on various factors such as player status, past performance measures, monetization potential, being a new player, among others.

The player matching system 306 may include additional modules for carrying out various other optional functionalities. One or more of the modules and databases described above may be implemented jointly or separated further into additional modules. In some embodiments, the player matching system 306 may be implemented on a computing device or a network of server computing devices that includes one or more processors and one or more memory which may contain software applications executed by the processors. The features and services provided by the player matching system 306 may be implemented as a web services consumable via a communication network. In further embodiments, the player matching system 306 can be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The game database 322 may store various data related to one or more games or game types. Various aspects of the player matching system 306, such as the match model 310, the optimization module 314, the decision module 316, and the query module 318 may access the game database 322 to obtain data to carry out their respective functions. The game database may include game rules and constraints for the one or more games, which may define the number of players needed for a game session, the types of roles needed for a game session, a time duration of the game session, and the like.

Figure 4:
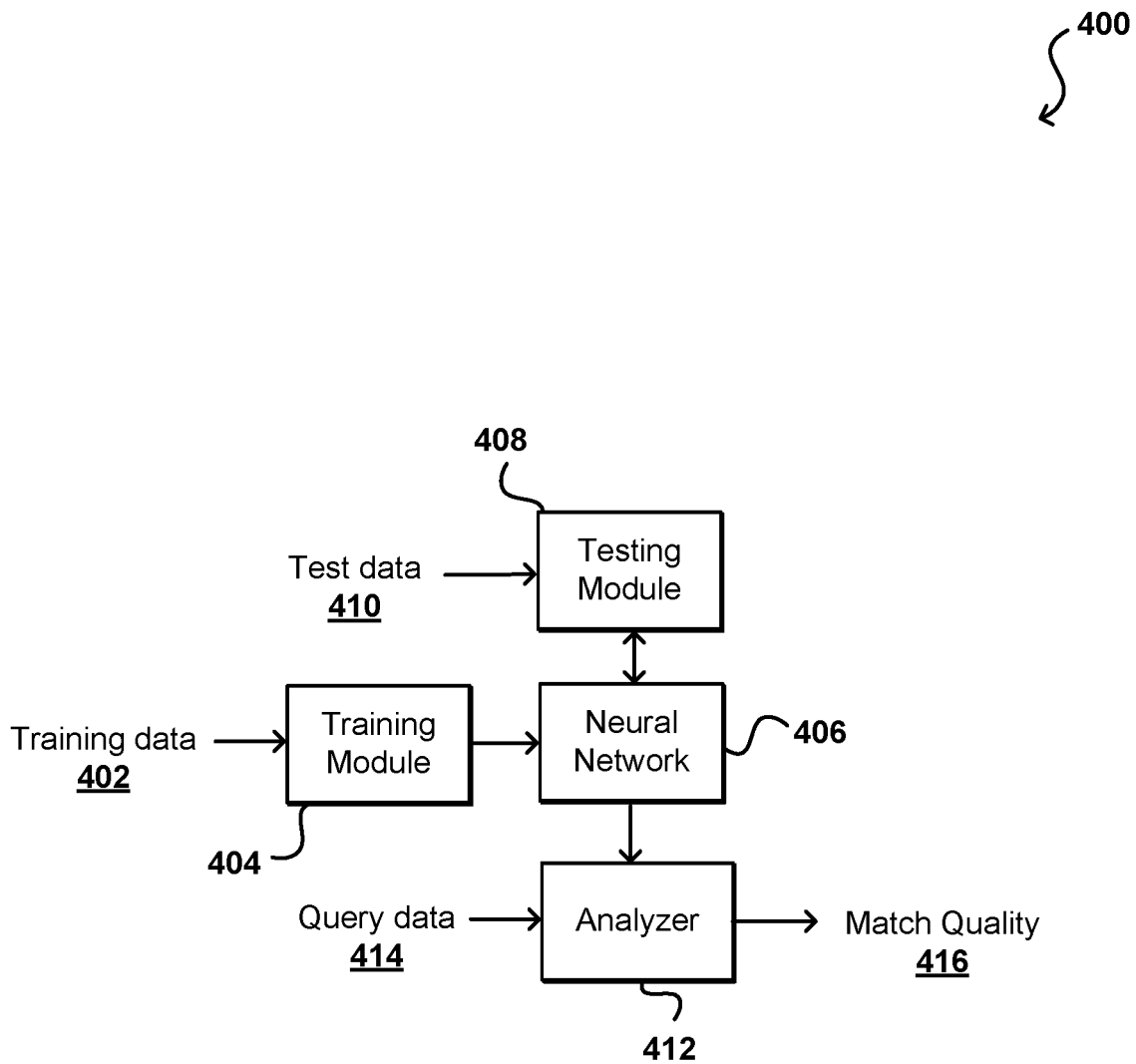
FIG. 4 illustrates an example user matching analysis pipeline that can be utilized in accordance with various embodiments.

FIG. 4 illustrates an example player grouping analysis pipeline 400 that can be utilized in accordance with various embodiments. In this example, training data 402 is obtained that can be used to train one or more neural networks 406, such as the neural network of match model 310 (FIG. 3) to determine a match quality of a set of queried players within respect to an optimization parameter. The training data may include game data from a plurality of observed game sessions in which each game session involves a set of players. For each observed game session, the game data may include a set of player attributes associated with the set of players and a set of game outcome parameters associated with the game session, including an optimization parameter. In this example, the training data is accessible to a training module 404 which can feed the training data to a neural network 406 in order to train the network. Specifically, the observed player attribute values and observed optimization parameter values will be fed to the neural network 406 so the neural network can determine relationships between specific combinations of player attribute values and associated combination of optimization parameter values. Given a large number of such example relationships, the neural network 406 can estimate how certain combinations of player attributes may affect certain optimization parameters or combinations of optimization parameters, such that when query player attributes are processed with the trained neural network 406, the network can analyze the queried player attribute values to predict one or more optimization parameter values, although various other approaches can be utilized as well within the scope of the various embodiments.

In some embodiments, once at least the initial training has completed, a testing module 408 can utilize testing data 410 to test the trained neural network and determine if the network is adequately trained or has achieved an acceptable level of accuracy. The testing data 410 may be similar to the training data and include game data from a plurality of observed game sessions in which each game session involves a set of players. For each observed game session, the game data may include a set of player attributes associated with the set of players and a set of game outcome parameters associated with the game session, including an optimization parameter. The player attributes for a specific game session are inputs to the testing module 408 and fed into the neural network. The neural network may output one or more expected optimization parameter values. The expected optimization parameter values are compared to the respective observed optimization parameter values to gauge how the accuracy of the neural network for this use instance. If the accuracy is acceptable, or if the average accuracy over a plurality of tests is acceptable, the neural network may be deployed and used. During use, query data 414 such as player attributes of a set of queried players may be accessed by the analyzer 412 and fed through the neural network to produce a match quality 416. In some embodiments, an expected value of the optimization parameter is determined and the analyzer 412 may compare the expected value to a plurality of observed values of the optimization parameter from training data or past game sessions, in order to determine the match quality 416.

Although various embodiments described herein reference a gaming environment that includes gaming applications, the techniques described herein can readily be applied to various other types of applications and/or environments for those applications. The techniques described herein can be used to match or assign users into user groups based on user attributes for any type of application in which users are associated with user data and the application provides one or more outcomes or optimization parameters. Specifically, as described in a detail above, a queried set of users of an application may be processed through a match model that is trained to determine a match quality of a set of users with respect to an optimization parameter, in which the match quality based at least in part on user attributes associated with the set of users. The match model determines the match quality of the queried set of users, and the queried set of users is assigned to a user group if the match quality satisfies a threshold. Assigning a queried set of users into a user group may also be based at least in part on a group rule. The gaming application described above is one illustrative example of an application, and the players described above is one illustrate example a user, and game session is one illustrative example a user group. Thus, all the techniques and details described above with respect to gaming applications and matching players are applicable for any application and any type of user. In some embodiments, such applications may be developed or managed by a content provider, hosted by a resource provider, such as game host 102 (FIG. 1), and accessed for used by a user, such as players 104, 106 (FIG. 1). In some embodiments, the resource provider may also be the content provider, in which the same entity develops, manages, and hosts the application. In some embodiments, the content provider and the resource provider are separate entities and the content provider may utilize resources provided by the resource provider to develop, host, or deploy the application, among other services provided by the resource provider. In accordance with various embodiments, the resource provider is a multi-tenant resource provider, such as a cloud computing platform, provides an environment and tools that can be utilized to build and/or host applications such as games, websites, mobile apps, and the like.

Figure 5:
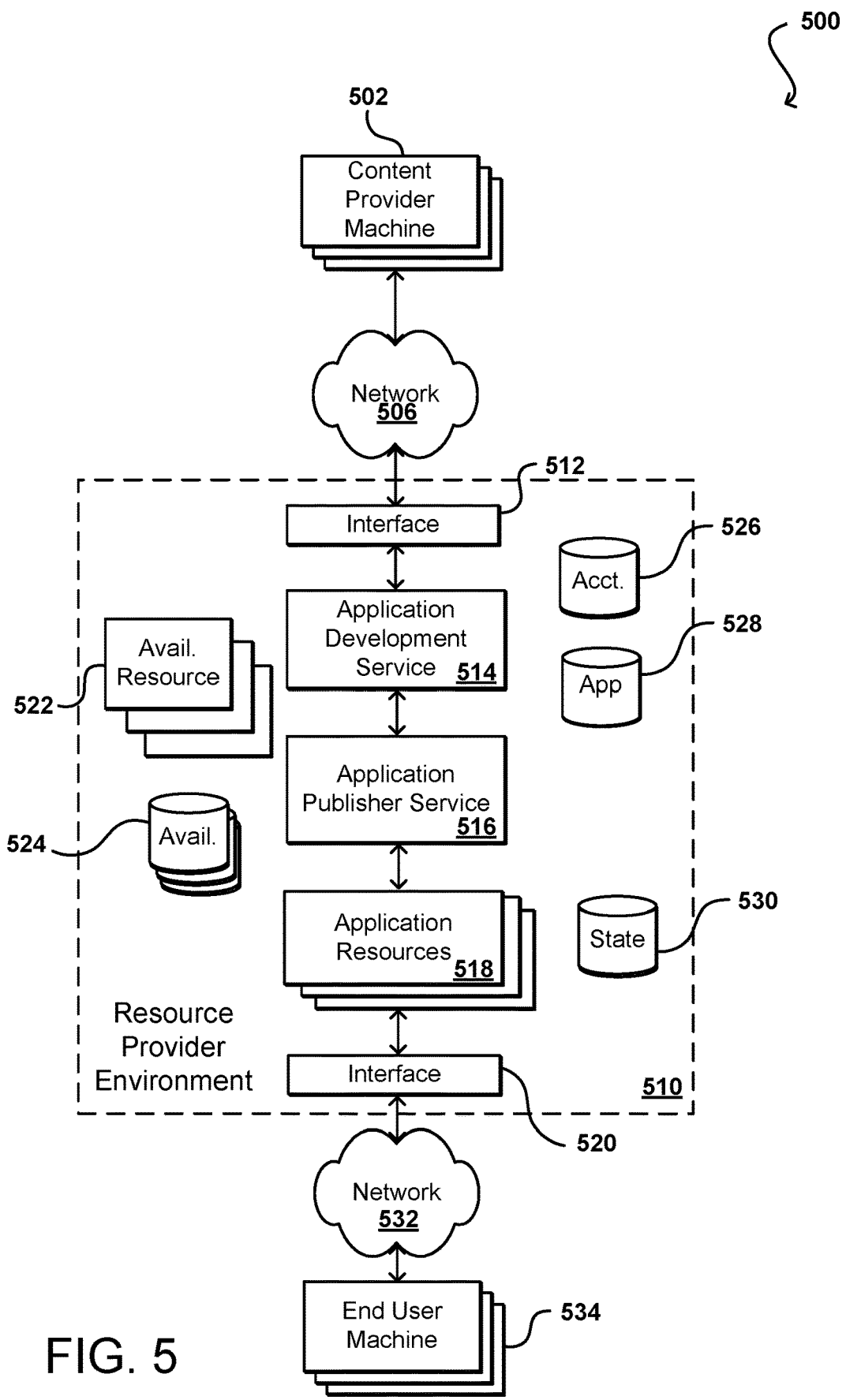
FIG. 5 illustrates an example environment through which an application can be developed and deployed, in accordance with various embodiments.

FIG. 5 illustrates an example environment 500 in which aspects of various embodiments can be implemented. Specifically, FIG. 5 illustrates an example environment 500 in which a content provider develops or manages an application, such as a gaming application utilizing one or more resources of a resource provider environment 510 maintained by a resource provider, which can be accessed by an end user, such as a player, through the resource provider environment 510. In this example, the content provider is able to utilize one or more content provider machines 502 to submit requests across at least one network 506 to the resource provider environment 510. The content provider may provide game code or data that is executed by the resource environment 510 to provide the game, including constraints and preferences for user matching. The content provider may also define and update optimization preferences to the resource provider environment. The content provider machines 502 can include any appropriate electronic device operable to send and receive requests, messages, or other such information over an appropriate network and convey information back to a user of the device. Examples of such devices include personal computers, tablet computers, smart phones, notebook computers, and the like. The at least one network 506 can include any appropriate network, including an intranet, the Internet, a cellular network, a local area network (LAN), or any other such network or combination, and communication over the network can be enabled via wired and/or wireless connections. The content provider machines 502 can access the resource provider environment 510 to develop the application, manage the application, collect information, and interact with end users, among others. The resource environment 510 can include any appropriate components for receiving requests and returning information or performing actions in response to those requests. As an example, the service provider environment might include computing resources 522, such as Web servers and/or application servers for receiving and processing requests, then returning content or information in response to the request. The environment can also include various repositories 524 that can be allocated for use by, or on behalf of, various clients or applications of the environment. In at least some embodiments, all or a portion of a given resource, or set of resources, might be allocated to a particular client or allocated for a particular task, for at least a determined period of time. The sharing of these multi-tenant resources from a provider environment is often referred to as resource sharing, Web services, or "cloud computing," among other such terms and depending upon the specific environment and/or implementation.

In an example embodiment, at least some of the resources 522 are used to support an application development service 514, which includes platforms and services useful in the development and providing of software applications. For example, the software application may be an electronic gaming application that includes three-dimensional graphical content, among other such options, and the application development service 514 may include an electronic game development platform. The content provider machine can access the application development service via an interface layer 512. In this example, the interface layer 512 provides a means for the content provider machine to interact with the application development service, thereby enabling the content provider to user the application development service to create, develop, and manage an application. In some embodiments, the interface layer 512 provides a graphical user interface.

Once application development reaches an appropriate stage in the development cycle or pipeline, as may relate to alpha or beta testing, actual release or updating, etc., the appropriate content can be made accessible to an application publisher service 516. The application publisher service 516 can receive instructions regarding the type of release, format of the release, and other appropriate information, and can cause the application content to be published to an appropriate location for access. While illustrated as part of the service provider environment 510, it should be understood that components such as the application servers or application publisher could be executed on a local client machine as well, whether one of the content provider machines 502 or otherwise. If the application is to be made available to end users, applications, or other such persons or entities, the application publisher service 516 may publish the application content to an array of application resources 518 which can run the application and enable end user machines 534 to access the application content over one or more networks 532, which may be different from the network(s) 506 used for application development. This can include, for example, dedicated application networks, the Internet, cellular networks, and the like. The end user machines 534 can communicate with the appropriate interfaces of an interface layer 520 to obtain the application content. In some embodiments the end user machines 532 may download the application content for execution on the individual machines, and will upload (or otherwise communicate) application data, messages, and other information to the application resources 518, as well as to other end users, social networking sites, or other such recipients. The application resources 518 can cause state information for the various instances of the application to be stored to at least one application state repository 530. User account data can be stored to an account repository 526 and various application data can be stored to an application repository 528 This can hold state for the application as a whole or for individual application sessions, among other such options. In some embodiments the application content can be executed by the application servers and streamed in near real time to the end user machines 534. In some embodiments there may alternatively be a mix of application content executed on the end user machines 534 and the application servers. Peer to peer connections among the end user machines 534 and other communications can be utilized as well in various embodiments.

Such an environment 510 enables clients such as content providers and end users to obtain and configure computing resources over a network such as the Internet to perform various types of computing operations (e.g., execute code, including threads, programs, software, routines, subroutines, processes, etc.). Thus, developers, such as content providers, can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Figure 6:
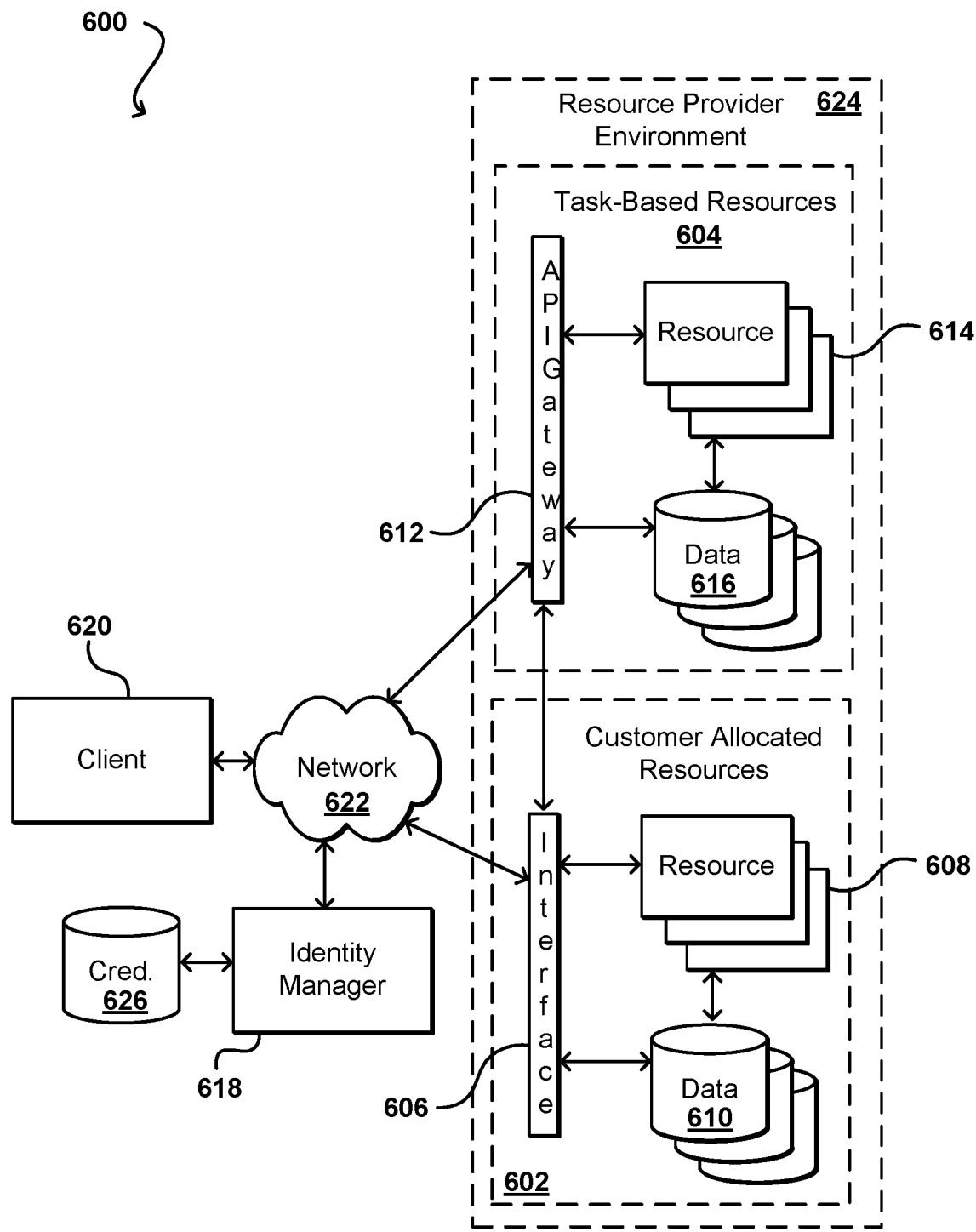
FIG. 6 illustrates an example environment in which user matching can be implemented, in accordance with various embodiments.

FIG. 6 illustrates an example environment 600 in which aspects of the various embodiments can be implemented. The game host 102 of FIG. 1 may also be implemented using the resources of example environment 600. Resource environment may host one or more game session and perform player matching to match players into the one or more game sessions according to the player matching techniques of the present disclosure. Specifically, the example player matching system 300 of FIG. 3 can be implemented using the resources of example environment 600. For example, one or more of the resources of resource environment 600 may be used or access to implement interface 308, player match model 310, training module 312, optimization module 314, decision module 316, query module 318, player database 320, game database 322, and training database 324.

A player may access the game via a client device 620, which may access or utilize a resource provider environment 624 on which a player matching system is implemented. The resource provider environment 624 can optimize matching of players in one or more game sessions with respect to one or more optimization parameters. In this example, the client device 620 is able to communicate with a multi-tenant resource provider environment 624 across at least one network 622. In some embodiments, the client device 620 may be a content provider such as a game developer accessing the resource provider 624 to develop the game or define player matching preferences. The client device 620 may also be a player accessing the resource player environment to access and play the game, as well as to get assigned to a game session. In some embodiments, the multi-tenant resource provider environment 624 may host, or otherwise provide, a game that a player can play or otherwise interact with through the client device 620. The client device 620 can include any appropriate electronic device operable to send and receive requests, messages, or other such information over an appropriate network and convey information back to a user of the device. Examples of such client devices include personal computers, gaming consoles, tablet computers, smart phones, notebook computers, and the like. The at least one network 622 can include any appropriate network, including an intranet, the Internet, a cellular network, a local area network (LAN), a specialized gaming network, or any other such network or combination, and communication over the network 622 can be enabled via wired and/or wireless connections. The resource provider environment 624 can include any appropriate components for receiving requests and returning information or performing actions in response to those requests.

In this example, the client device 620 is able to call into two different interface layers, although the interfaces could be part of a single layer or multiple layers in other embodiments. In this example, the client device 620 may make calls into an interface 606 and there can be a set of customer allocated resources, both computing resources 608 and data resources 610, among others, allocated on behalf of the customer in the resource provider environment 624. These can be physical and/or virtual resources, but during the period of allocation the resources (or allocated portions of the resources) are only accessible using credentials associated with the customer account. These can include, for example, gaming servers and game databases that are utilized over a period of time for various customer applications. The client device 620 can also make calls into an API gateway 612, or other such interface layer, of a task-based resource environment 604, or sub-environment. In such an environment, portions of various resources such as computing resources 614 and data resources 616 can be allocated dynamically and on a task-specific basis for at least a determined period. There can be resources allocated to perform a specific type of processing, and those resources can be allocated on an as-needed basis where the customer is only charged for the actual processing in response to a specific task. Approaches in accordance with various embodiments can enable customers, such as game developers, to leverage both types of allocations in their applications. This can include, for example, the ability to include on-demand cloud resource support for gaming applications and other such offerings. For example, an application may be developed or hosted on the environment, in which application data and application elements are distributed across one or more of the computing resources 614 and/or data resources 616, and in which the resources 614, 616 are utilized to carry out certain functions of the application. The present techniques provide for predictively initializing the resources 614, 616 to carry out various functions associated with various aspects of the application before such functions are executed such that latency associated with such initialization can be hidden.

The sharing of these multi-tenant resources from a resource provider environment 624 is often referred to as resource sharing, Web services, or "cloud computing," among other such terms and depending upon the specific environment and/or implementation. In at least some embodiments, a user wanting to utilize a portion of the resources can submit a request that is received to an interface layer of the resource provider environment 624. The interface layer can include application programming interfaces (APIs) or other exposed interfaces enabling a user to submit requests to the provider environment. The interface layers in this example can also include other components as well, such as at least one Web server, routing components, load balancers, and the like. When a request to provision a resource is received to the interface layer, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. An identity manager 618 can validate this information against information stored for the user in a credentials repository 626. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The client can receive a resource identifier, specific address, or other such information that can enable the client device to communicate with an allocated resource without having to communicate with the resource manager, at least until such time as a relevant aspect of the user account changes, the user is no longer granted access to the resource, or another such aspect changes. The resource manager (or another such system or service) in this example can also function as a virtual layer of hardware and software components that handles control functions in addition to management actions, as may include provisioning, scaling, replication, etc. The resource manager can utilize dedicated APIs in the interface layer, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer in at least one embodiment includes a scalable set of client-facing servers that can provide the various APIs and return the appropriate responses based on the API specifications. The interface layer also can include at least one API service layer that in one embodiment consists of stateless, replicated servers which process the externally-facing client APIs. The interface layer can be responsible for Web service front end features such as authenticating clients based on credentials, authorizing the client, throttling client requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, clients of the control service. The servers of the Web services layer can be stateless and scaled horizontally as known in the art. API servers, as well as the persistent data store, can be spread across multiple data centers in a region, for example, such that the servers are resilient to single data center failures.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers. For example, an application such as a video game may be developed or hosted on the environment, in which application data and application elements are distributed across one or more physical or virtual computing resources, and in which the resources are utilized to carry out certain functions of the application. The present techniques provide for predictively initializing the resources to carry out various functions associated with various aspects of the application before such functions are executed such that latency associated with such initialization can be hidden.

In many such environments, resource instances such as virtual machines are allocated to a client (or other authorized user) for a period of time in order to process tasks on behalf of that client. In many cases, however, a client may not have a steady flow of work such that the client must maintain a sufficient number of virtual machines to handle peak periods of work but will often have less than this amount of work. This can result in underutilization and unneeded expense for both the client and the resource provider. Approaches in accordance with various embodiments can instead allocate resource instances on a task or event basis to execute a function. A resource instance can be allocated to run a function in response to a client request or event, including performing certain game functions. Once the function has completed that instance can either be made available for processing a different event or destroyed, among other such options. In either case, the client will not be charged for more processing by the instance than was needed to run the function.

Figure 7:
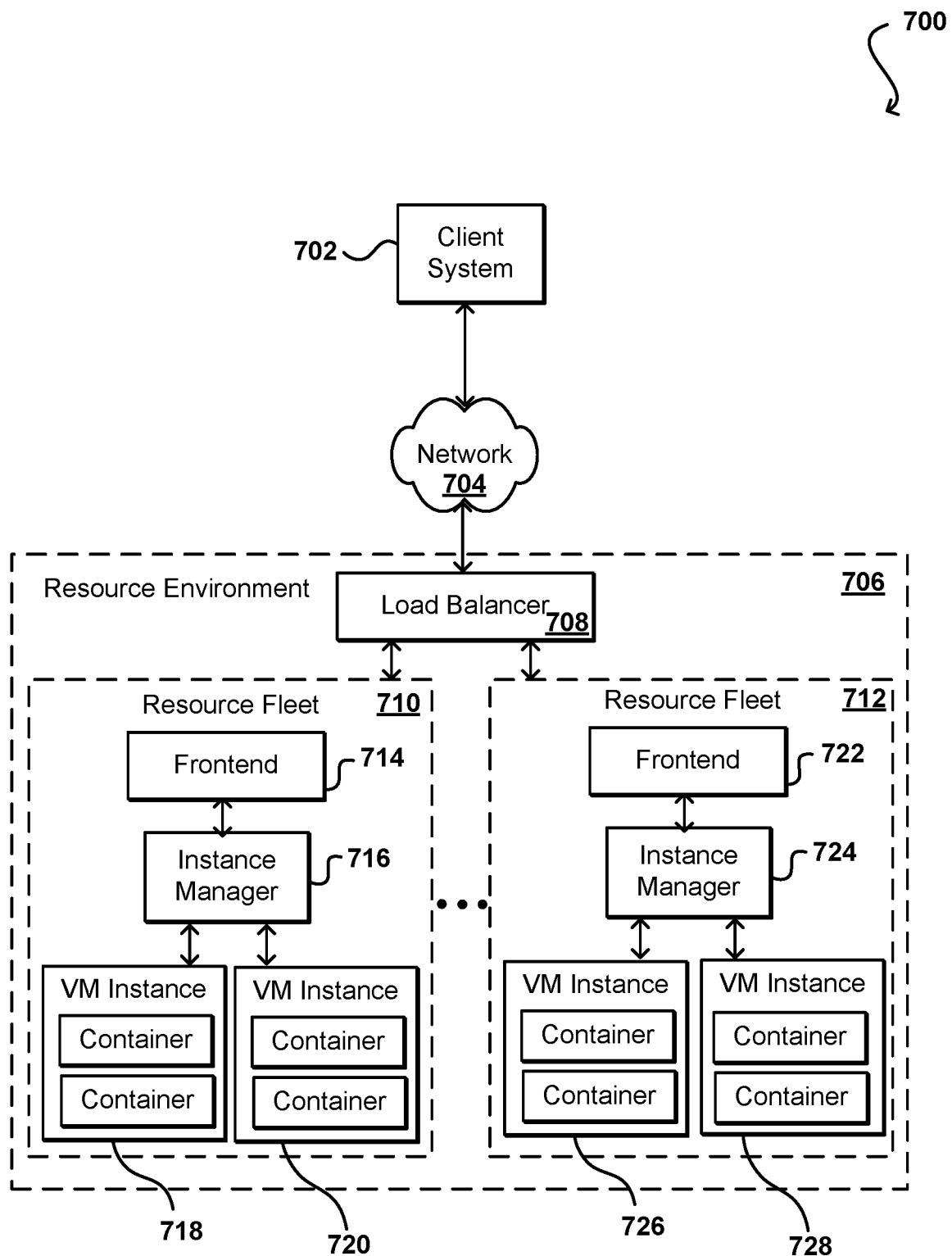
FIG. 7 illustrates components of an example environment that can be used to implement functions for user matching, in accordance with various embodiments.

FIG. 7 illustrates components of an example environment 700 that can be used to implement such functionality. A client system 702 may access or utilize a resource environment 706 on which a player matching system 706 is implemented, such that the resource environment 706 can perform player matching. Such functionality can be offered as a service, such as a Web service, in at least some embodiments, wherein a client system 702, such as a player device or a content provider machine, can submit requests or event information over at least one network 704 to the resource environment (i.e., a resource provider environment, service provider environment, or other shared resource or multi-tenant environment). In some embodiments, the client device 602 may be a content provider such as a game developer accessing the resource provider 624 to develop the game or define player matching preferences. The client device 602 may also be a player accessing the resource player environment to access and play the game, as well as to get assigned to a game session. The compute service offered by the resource environment can be referred to as a "serverless" compute service that can allocate virtual resources to execute registered functions in response to client events and automatically manage the underlying compute resources. The functions can be executed on high-availability compute infrastructure that can perform the administration of the compute resources, including server and operating system maintenance, capacity provisioning and automatic scaling, code and security patch deployment, and code monitoring and logging. Clients supply the code to be executed and can be billed based on the actual amount of compute time utilized on behalf of those clients.

In some embodiments, a registered function can include the client code as well as associated configuration information. The configuration information can include, for example, the function name and resource requirements. Registered functions can be considered to be "stateless," in that they do not rely on state contained in the infrastructure and considered to be lacking affinity to the underlying infrastructure (e.g., the functions are not installed or otherwise tied to the operating system running in the virtual machine), so that the resource managers can rapidly launch as many copies of the function as is needed to scale to the rate of incoming events. A client providing the code for a function can specify various configuration parameters, such as the memory, timeout period, and access rules, among other such aspects. The client in some embodiments can also specify resources that are able to trigger execution of a registered function by a resource instance. These resources can include, for example, data buckets, database tables, or data streams, among other such options. The resource manager can invoke the code only when needed and automatically scale to support the rate of incoming requests without requiring configuration or management on behalf of the client. A function can be executed by an allocated resource instance within milliseconds of an event in at least some embodiments, and since the service scales automatically the performance will remain consistently high as the frequency of events increases. Further, since the code is stateless the service can initialize as many resource instances as needed without lengthy deployment and configuration delays.

An environment such as that described with respect to FIG. 7 can facilitate the handling of requests to execute user code on a virtual compute fleet by utilizing the containers created on the virtual machine instances as compute capacity. Information for a request or event can be received to a load balancer 708 that can determine an appropriate resource fleet 710, 712 to which to direct the information. The decision can be based upon various types of information, as may include the context associated with the type of event or request. Upon receiving a request to execute user code on a selected virtual compute fleet 710, 712, a frontend service 714, 722 associated with the virtual compute fleet can provide the information to an instance manager, which can direct the information to a virtual machine (VM) instance 718, 720, 726, 728 where a container on the instance can provide an execution environment for the registered function. The client device 702 may utilize one or more user interfaces, command-line interfaces (CLIs), application programing interfaces (APIs), and/or other programmatic interfaces for generating and uploading client code, invoking the client code (e.g., submitting a request to execute the code on the virtual compute system), scheduling event-based jobs or timed jobs, tracking the client code, and/or viewing other logging or monitoring information related to their requests and/or client code. Although one or more embodiments may be described herein as using a user interface, it should be appreciated that such embodiments may, additionally or alternatively, use any CLIs, APIs, or other programmatic interfaces.

Client may use the resource fleets 710, 712 to execute code thereon. Code as used herein may refer to any program code (e.g., a program, routine, subroutine, thread, etc.) written in a program language. Such client code may be executed to achieve a specific task, for example, in connection with a particular web application or mobile application developed by the user. For example, a client may wish to run a piece of code in connection with a web or mobile application that the client has developed. One way of running the code would be to acquire virtual machine instances from service providers who provide infrastructure as a service, configure the virtual machine instances to suit the client's needs, and use the configured virtual machine instances to run the code. Alternatively, the client may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the client from the burden of having to worry about over-utilization (e.g., acquiring too little computing resources and suffering performance issues) or under-utilization (e.g., acquiring more computing resources necessary to run the codes, and thus overpaying).

In the configuration depicted in FIG. 7, a first resource fleet 710 includes a frontend 714, an instance manager 716 (later referred to herein as a worker manager), and virtual machine instances 718, 720. Similarly, other resource fleets 712 can also include a frontend 722, an instance manager 724, and virtual machine instances 726, 728, and there can be any appropriate number of resource fleets and any appropriate number of instances in each resource fleet. The environment can include low and high frequency fleets as well in at least some embodiments, as may serve different types of requests or requests for different types of clients. The fleets can also include any number of worker managers, and in some embodiments the frontend and the worker manager can be resident on a single virtual machine instance. In some embodiments, the load balancer 708 serves as a front door to all the other services provided by the virtual compute system. The load balancer 708 processes requests to execute user code on the virtual compute system and handles the first level of load balancing across the frontends 714, 722. For example, the load balancer 708 may distribute the requests among the frontends 714, 722 (e.g., based on the individual capacity of the frontends). The requests can be distributed evenly across the frontends or distributed based on the available capacity on the respective fleets, among other such options. In some embodiments, the frontend 714 for a fleet can determine that the requests are properly authorized. For example, the frontend 714 may determine whether the user associated with the request is authorized to access the client code specified in the request. The frontend 714 may also receive the request to execute such client code when an event is detected, such as an event that the client has registered to trigger automatic request generation. Alternatively, the client may have registered a timed job (e.g., execute the user code every 24 hours). In yet another example, the frontend 714 may have a queue of incoming code execution requests, and when the batch job for a client is removed from the virtual compute system's work queue, the frontend 714 may process the client request. In yet another example, the request may originate from another component within the resource environment 706 or other servers or services not illustrated in FIG. 7.

The frontend 714 can receive requests to execute client code on the virtual compute system that have been processed by the load balancer 708. The frontend 714 can request the instance manager 716 associated with the frontend 714 of the particular fleet 710 to find compute capacity in one of the virtual machine instances 718, 720 managed by the instance manager 716. The frontend 714 may include a usage data manager for determining the usage status (e.g., indicating how frequently the user code is executed) of a particular client code, and a client code execution manager for facilitating the execution of client code on one of the virtual machine instances managed by the worker manager. The instance manager 716 manages the virtual machine instances in the respective fleet. After a request has been successfully processed by the load balancer 708 and the frontend 714, the instance manager 716 finds capacity to service the request to execute client code on the virtual compute system. For example, if a container exists on a particular virtual machine instance that has the user code loaded thereon, the instance manager 716 may assign the container to the request and cause the request to be executed in the container. Alternatively, if the client code is available in the local cache of one of the virtual machine instances, the instance manager 716 may create a new container on such an instance, assign the container to the request, and cause the client code to be loaded and executed in the container. Otherwise, the instance manager 716 may assign a new virtual machine instance to the client associated with the request from the pool of pre-initialized and pre-configured virtual machine instances, download the client code onto a container created on the virtual machine instance, and cause the client code to be executed in the container.

In some embodiments, once a virtual machine instance has been assigned to a particular client, the same virtual machine instance cannot be used to service requests of any other client. This provides security benefits to clients by preventing possible co-mingling of user resources. Alternatively, in some embodiments, multiple containers belonging to different clients (or assigned to requests associated with different clients) may co-exist on a single virtual machine instance. Such an approach may improve utilization of the available compute capacity. Although the virtual machine instances are described here as being assigned to a particular client, in some embodiments the instances may be assigned to a group of clients, such that an instance is tied to the group of clients and any member of the group can utilize resources on the instance. For example, the clients in the same group may belong to the same security group (e.g., based on their security credentials) such that executing one member's code in a container on a particular instance after another member's code has been executed in another container on the same instance does not pose security risks. Similarly, the instance manager 716 may assign the instances and the containers according to one or more policies that dictate which requests can be executed in which containers and which instances can be assigned to which clients. The instance manager 716 may also manage creation, preparation, and configuration of containers within virtual machine instances. Containers can be logical units within a virtual machine instance and utilize resources of the virtual machine instances to execute client code. Based on configuration information associated with a request to execute client code, such a container manager can create containers inside a virtual machine instance. In one embodiment, such containers are implemented as Linux containers. After the client code has been executed, the instance manager 716 may tear down the container used to execute the user code to free up the resources it occupied to be used for other containers in the instance. Alternatively, the instance manager 716 may keep the container running to use it to service additional requests from the same client. The determination of whether to keep the container and/or the instance running after the user code is done executing may be based on a threshold time, the type of the user, average request volume of the user, and/or other operating conditions.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions. Resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests. Implementation of the present player matching system on the environment 700 provides the environment 700 and its resources with the technological function of optimizing player grouping while minimizing the computing resources required to do so, thereby, among other reasons, bringing about an improving the computing technology.

Figure 8:
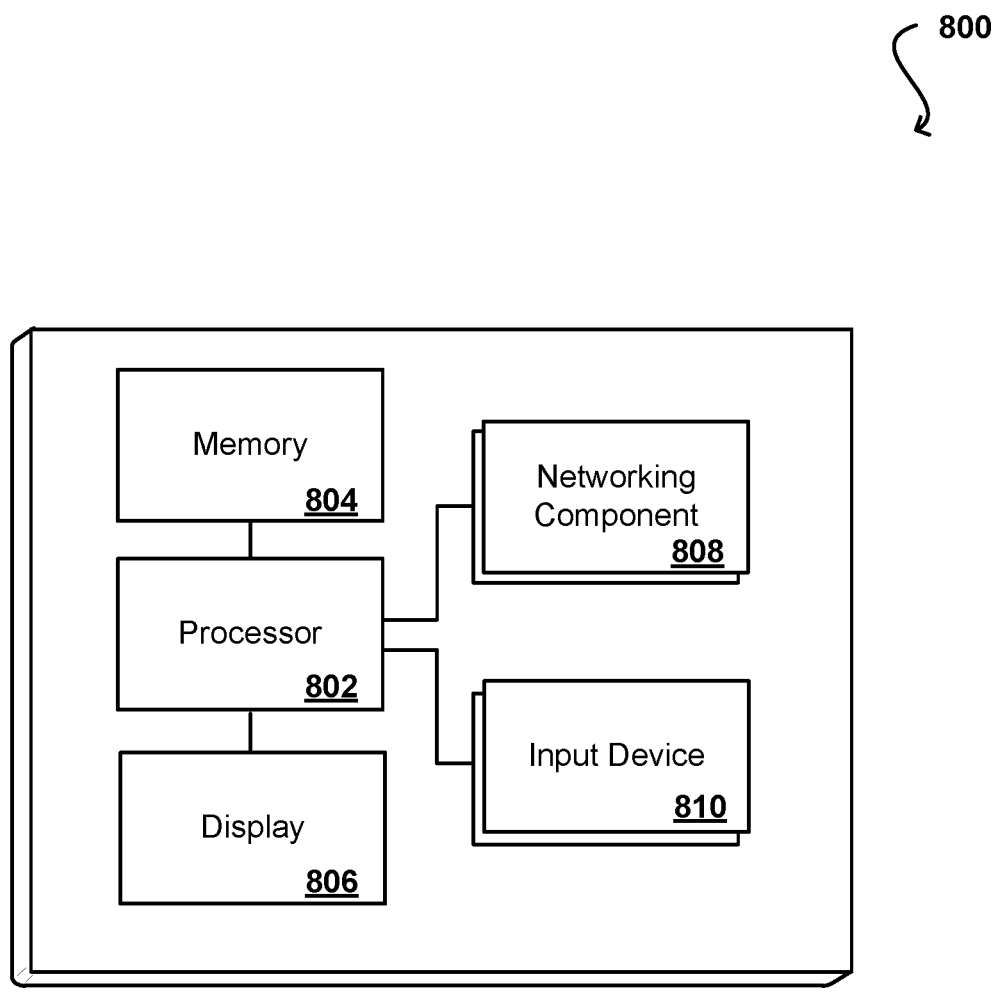
FIG. 8 illustrates a set of basic components of an example computing device that can be utilized to implement aspects of the various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
  at least one computing device processor; and
  a memory device including instructions that, when executed by the at least one computing device processor, enables the computing system to:
    receive training data associated with an observed game session involving a set of players, the training data including i) player attributes associated with the set of players and ii) game outcome parameters associated with the observed game session, including an observed value of an optimization parameter;
    train a neural network, using the training data, to determine a match quality of a given set of players with respect to the optimization parameter, the match quality based at least in part on player attributes associated with the given set of players;
    receive player attributes associated with a queried set of players;
    process the player attributes associated with the queried set of players through the neural network;
    determine the match quality of the queried set of players; and
    assign the queried set of players to a multi-player game session based at least in part on the match quality of the queried set of players, satisfying a predetermined threshold value.

2. The computing system of claim 1, wherein the instructions when executed further cause the computing system to:
  use the neural network to determine an expected value of the optimization parameter associated with the queried set of players; and
  determine the match quality of the queried set of players based at least in part on the expected value of the optimization parameter.

3. The computing system of claim 2, wherein the instructions when executed further cause the computing system to:
  compare the expected value of the optimization parameter with observed values of the optimization parameter associated with a plurality of observed game sessions; and
  determine the match quality of the queried set of players based at least in part on the expected value relative to the observed values of the optimization parameter.

4. A computing system, comprising:
  at least one computing device processor; and
  a memory device including instructions that, when executed by the at least one computing device processor, enables the computing system to:
    provide a match model trained to determine a match quality of a set of users with respect to an optimization parameter, the match quality based at least in part on user attributes associated with the set of users;
    receive user attributes associated with a queried set of users;
    process the user attributes associated with the queried set of users through the match model;
    determine a match quality of the queried set of users; and
    assign at least a portion of the queried set of users into a user group based at least in part on the match quality of the queried set of users, satisfying a predetermined threshold value.

5. The computing system of claim 4, wherein the instructions when executed further cause the computing system to:
  train the match model using training data associated with an observed user group involving an observed set of users, the training data including i) user attributes associated with the observed set of users, and ii) an observed value of the optimization parameter associated with the observed user group.

6. The computing system of claim 4, wherein the instructions when executed further cause the computing system to:
  determine, via a neural network of the match model, an expected value of the optimization parameter associated with the queried set of users based on the user attributes associated with the queried set of users; and determine the match quality of the queried set of users based at least in part on the expected value of the optimization parameter.

7. The computing system of claim 6, wherein the instructions when executed further cause the computing system to:
obtain observed values of the optimization parameter associated with a plurality of observed user groups; and
determine the match quality of the queried set of users based at least in part on the expected value with respect to a distribution of the observed values.

8. The computing system of claim 4, wherein the instructions when executed further cause the computing system to:
compare the match quality to a first tier threshold; and
assign the queried set of users into the user group if the match quality satisfies the first tier threshold.

9. The computing system of claim 8, wherein the instructions when executed further cause the computing system to:
compare the match quality to a second tier threshold if the match quality does not satisfy the first tier threshold, the second tier threshold representing a lower match quality than the first tier threshold; and
assign the queried set of users into the group if the match quality satisfies the second tier threshold.

10. The computing system of claim 4, wherein the optimization parameter includes at least one of: a statistic of the user grouping, an engagement measure of the user grouping, a retention measure of the user grouping, a user reported rating, or a monetization measure of the user grouping.

11. The computing system of claim 4, wherein the optimization parameter includes a known or estimated experience preference of an individual user in the queried set of users.

12. The computing system of claim 4, wherein the instructions when executed further cause the computing system to:
assign a first subset of the queried set of users to a first sub-group of the user group based at least in part on user attributes associated with the first subset of the queried set of users; and
assign a second subset of the queried set of users to a second sub-group of the user group based at least in part on user attributes associated with the second subset of the queried set of user.

13. The computing system of claim 4, wherein the instructions when executed further cause the computing system to:
select the queried set of users from a pool of users requesting to be matched into a user group according to a query selection protocol.

14. The computing system of claim 4, wherein the instructions when executed further cause the computing system to:
receive a grouping rule; and
assign at least a portion of the queried set of users into the user group based at least in part on the grouping rule.

15. The computing system of claim 4, wherein the instructions when executed further cause the computing system to:
receive user attributes associated with a second queried set of users;
assign the second queried set of users into an experimental user group;
receive an experimental value of the optimization parameter associated with the experimental user group; and
train the match model using the user attributes associated with the second queried set of users and the experimental value of the optimization parameter.

16. A computer-implemented method, comprising:
providing a match model trained to determine a match quality of a set of users with respect to an optimization parameter, the match quality based at least in part on user attributes associated with the set of users;
receiving user attributes associated with a queried set of users;
processing the user attributes associated with the queried set of users through the match model;
determining a match quality of the queried set of users; and
assigning at least a portion of the queried set of users into a user group based at least in part on the match quality of the queried set of users, satisfying a predetermined threshold value.

17. The computer-implemented method of claim 16, further comprising:
training the match model using training data associated with an observed user group involving an observed set of users, the training data including i) user attributes associated with the observed set of users, and ii) an observed value of the optimization parameter associated with the observed user group.

18. The computer-implemented method of claim 16, further comprising:
determining an expected value of the optimization parameter associated with the queried set of users based on the user attributes associated with the queried set of users; and
determine the match quality of the queried set of users based at least in part on the expected value of the optimization parameter.

19. The computer-implemented method of claim 18, further comprising:
obtaining observed values of the optimization parameter associated with a plurality of observed user groups; and
determining the match quality of the queried set of users based at least in part on the expected value with respect to a distribution of the observed values.

* * * * *